United States Patent [19]

Lehtola

[11] 4,100,819
[45] Jul. 18, 1978

[54] ARRIS SPROCKET CHAIN

[75] Inventor: Erkki Topias Lehtola, Kaskinen, Finland

[73] Assignee: Oy Tahka AB, Kaskinen, Finland

[21] Appl. No.: 683,904

[22] Filed: May 6, 1976

[30] Foreign Application Priority Data

May 14, 1975 [FI] Finland .................................. 751420

[51] Int. Cl.² ............................................. F16G 13/00
[52] U.S. Cl. ................................................ 74/245 R
[58] Field of Search ....................................... 74/245 R

[56] References Cited

U.S. PATENT DOCUMENTS 3,628,392  12/1971  Ivashkov ............................ 74/245 R

*Primary Examiner*—Alan Cohan
*Attorney, Agent, or Firm*—Biebel, French & Nauman

[57] ABSTRACT

A chain, hereinafter called an arris sprocket chain, of the type consisting of two different alternating link types, wherein the first link type comprises two plates interconnected by two fixed fulcrum pins extending across the plates and being connected to the ends thereof, each pin having an arris parallel to the axis of the pin and directed towards the upper and end edges of the plates, and the second link type comprises two plates having at least one opening each for receiving the fulcrum pins of a pair of the first type links, said second longitudinal plates of the second link type being further interconnected in pairs by a pair of transverse plates in such a manner that the arrises of the fulcrum pins of two successive first links are in contact with the transversal plates of a second link between the first links. In order to provide the arris, the cross section of the fulcrum pin may be rectangular.

3 Claims, 2 Drawing Figures

ARRIS SPROCKET CHAIN

BACKGROUND OF THE INVENTION

1. Field of the Invention

The present invention relates to a chain, here called an arris sprocket chain, having alternating link types consisting of longitudinal plates, the first type links being, connected to each other in pairs by a pair of fulcrum pins, and the second type links being provided with openings for receiving and engaging the fulcrum pins of the first type links.

2. Description of the Prior Art

It is common to use chains of the type described wherein the fulcrum pins are of circular cross section and relatively closely fitted in openings or sleeves extending across the longitudinal plates of the adjacent link. In such chain, a rather wearing sliding friction is caused in the chain itself as well as between the chain and the teeth of driving wheel, and grease is used to keep the wear within tolerable limits.

SUMMARY OF THE INVENTION

The present invention provides a chain of the character described wherein no wearing sliding friction against the teeth and the drive shafts is caused when the chain passes around the driving and turning wheels. According to this invention, the chain comprises a plurality of first links, each including a pair of first longitudinal plates interconnected by a pair of fixed transverse fulcrum pins which are attached at the ends of the first longitudinal plates, and each fulcrum pin having an arris extending parallel with the axis of the pin and lying on one side of a line connecting the axes of the pair of pins and within the space between lines extending through the pin axes normal to the connecting line therebetween. A plurality of second links alternate with the first links, each second link including a pair of second longitudinal plates having each at least one opening for receiving the fulcrum pins of the adjacent first links, the second longitudinal plates being interconnected by a pair of transverse plates in such a way that the arris of a fulcrum pin is in contact with the associated transverse plate of the adjacent second link.

When the chain according to the present invention passes around the driving wheel, the arrises of the fulcrum pins remain in engaging contact with the associated transverse plates and, thus, only relative pivoting movement therebetween takes place. This reduces the wear of the chain considerably.

DESCRIPTION OF THE PREFERRED EMBODIMENT

In the figures a first link is indicated by 11 and a second link by 12. A fulcrum pin is indicated by 13 and transverse connecting plates of the second link by 14, and openings by 15, and a driving wheel around which the arris sprocket chain turns is indicated by 16 and its teeth by 17. Each link comprises two longitudinal side plates parallel to the chain; in the first link, the plates are interconnected by fulcrum pins 13 and in the second one by connecting plates 14, both the pins 13 and connecting plates 14 being fixed to their respective side plates.

Figure 1:
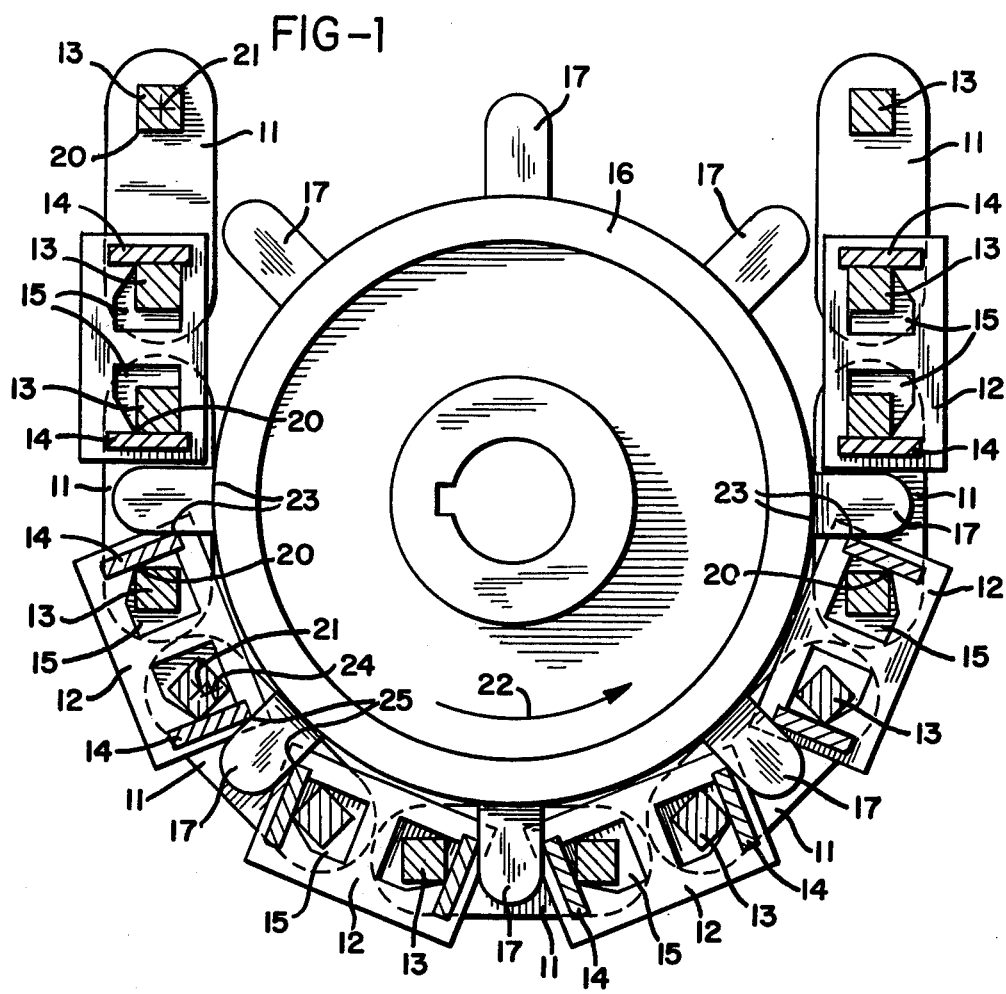
FIG. 1 shows schematically a side view of one embodiment of the chain according to the invention.
Figure 2:
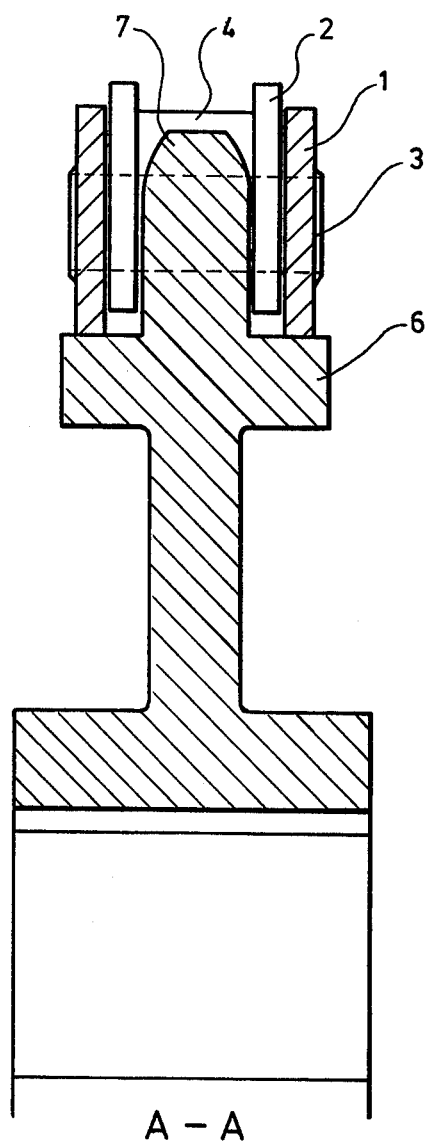
FIG. 2 shows an enlarged section along the line A-A of FIG. 1.

In FIGS. 1 and 2, each pin 13 is of square section and is so oriented that two adjacent sides define an arris 20 extending parallel with the pin axis 21 and lying on one side of a line connecting the axes of the pair of pins in the associated link 11 within the space between lines extending through the axes of the same pair of pins normal to the line connecting the axes. Thus as the chain travels around the wheel 16, the arrises 20 are directed obliquely outwardly of the wheel, and line outside the longitudinal center line of the chain.

The direction of the chain movement is indicated by arrow 22. When arriving at the driving wheel 16 the chain is straight, the center (axis) of the fulcrum pin 3 being at point 21. When the chain turns around the driving wheel 16 the chain touches the driving wheel 16 at points 23. At the same time, the pitch of the chain shortens as the axis 21 of the fulcrum pin 13 moves, as shown at point 24, for the reason that when the links 11 and 12 turn to some extent in relation to each other, the arris 20 of the fulcrum pin, when resting against the plate 14, pulls two successive links 11 closer to each other.

It must be noted here in particular that the contact point between the arris 20 and the plate 14 does not change during this movement, i.e., there is no sliding which would wear the arris 20 or the plate 14. It should also be noted that the lower edges 26 of the plates 14 press against the teeth 17 of the driving wheel 16 and thus no rubbing action which would wear the teeth 17 and the plates 14 can be produced here either. The pitch of the chain again increases when the chain becomes free from around the sprocket wheel 16, and the teeth 17 can freely detach from the chain.

The cross section of the fulcrum pin 13 need not necessarily be square as shown in the figure, but it can be rectangular, triangular, or even circular providing, for example, that an arris plate parallel to the axis of the pin has been fitted to it and directed obliquely and radially towards the upper and end edges of the side plates of the first link 11. The main point is that an arris 20 is formed which rests against the plate 14 and, when the chain turns around the driving wheel or turning wheel, causes the pitch of the chain to decrease, and when the chain becomes free from the wheel the pitch again increases.

Instead of the openings 15 the link 12 can just as well have one uninterrupted opening, providing care is taken that the fulcrum pins 13 can freely move in the openings or opening 15 when the chain turns around the driving wheel or turning wheel.

What is claimed is:

1. An arris sprocket chain comprising
   (a) a plurality of first links each including a pair of longitudinal plates interconnected in spaced relation by a pair of fulcrum pins fixedly secured to said plates adjacent the opposite ends thereof,
   (b) means on each of said pins defining an arris extending parallel with the axis of said pin and lying outside the center line connecting the axes of said pair of pins and within the space between lines extending through said pin axes normal to said center line,
   (c) a plurality of second links alternating with said first links,
   (d) each of said second links comprising a pair of longitudinally extending side plates interconnected in spaced relation by a pair of transverse plates fixedly secured thereto adjacent the opposite ends thereof, (e) each of said second links being received between said longitudinal plates of a pair of said first links, and (f) said second link side plates having holes therein receiving one of said fulcrum pins of each of said pair of first links freely therethrough with said arrises of said pins in pivoting contact with the opposed surfaces of said transverse plates to effect change in the pitch of said chain in passage around a sprocket wheel.

2. An arris sprocket chain as defined in claim 1 wherein each of said fulcrum pins is polygonal in cross section, and said arris thereof is defined by a pair of adjacent sides thereof.

3. An arris sprocket chain as defined in claim 2 wherein each of said fulcrum pins is rectangular in cross section.

* * * * *